United States Patent
Storm et al.

(10) Patent No.: US 6,983,030 B2
(45) Date of Patent: *Jan. 3, 2006

(54) APPROACH FOR PROCESSING DATA RECEIVED FROM A COMMUNICATIONS CHANNEL IN FINITE PRECISION ARITHMETIC APPLICATIONS

(75) Inventors: Andrew Storm, Victoria (AU); Shane Michael Tonissen, Victoria (AU); Efstratios Skafidas, Victoria (AU)

(73) Assignee: Bandspeed, Inc., Austin, TX (US)

( * ) Notice: Subject to any disclaimer, the term of this patent is extended or adjusted under 35 U.S.C. 154(b) by 902 days.

This patent is subject to a terminal disclaimer.

(21) Appl. No.: 09/754,007

(22) Filed: Jan. 2, 2001

(65) Prior Publication Data

US 2001/0036237 A1 Nov. 1, 2001

(51) Int. Cl.
*H04B 1/10* (2006.01)

(52) U.S. Cl. ...................................... 375/350
(58) Field of Classification Search ................. 375/350, 375/316, 229, 230, 232, 346, 297; 330/2, 330/149

See application file for complete search history.

(56) References Cited

U.S. PATENT DOCUMENTS

| | | | |
|---|---|---|---|
| 4,179,696 A | 12/1979 | Quesinberry et al. | |
| 5,068,873 A | 11/1991 | Murakami | ................... 375/13 |
| 5,111,481 A | 5/1992 | Chen et al. | ................... 375/14 |
| 5,432,816 A | 7/1995 | Gozzo | ........................ 375/232 |
| 5,432,821 A | 7/1995 | Polydoros et al. | ........... 375/340 |
| 5,703,903 A | * 12/1997 | Blanchard et al. | ........... 375/232 |

(Continued)

FOREIGN PATENT DOCUMENTS

| | | |
|---|---|---|
| EP | 0 795 985 A2 | 9/1997 |
| EP | 0 912 023 A1 | 4/1999 |
| EP | 1 043 875 A2 | 10/2000 |
| WO | WO 97/40587 | 10/1997 |
| WO | WO 98/59450 | 12/1998 |
| WO | WO 00/54472 | 9/2000 |

OTHER PUBLICATIONS

Melsa, P., et al., "Impulse Response Shortening for Discrete Multitone Transceivers", IEEE Transactions on Communications, vol. 44, No. 12, Dec. 1996.

Al–Dhahir, N., et al., "Optimum Finite–Length Equalization for Multicarrier Transceivers", IEEE Transactions on Communications, vol. 44, No. 1, Jan. 1996.

(Continued)

*Primary Examiner*—Khai Tran
(74) *Attorney, Agent, or Firm*—Hickman Palermo Truong & Becker, LLP; Edward A. Becker

(57) ABSTRACT

An approach for processing data received from a communications channel in finite precision arithmetic applications generally involves equalizing received data in the time domain prior to demodulation using finite impulse response (FIR) filtering. FIR coefficients used in FIR filtering are selected to minimize SNR degradation attributable to ISI and roundoff errors due to finite precision arithmetic, thereby maximizing channel capacity. The approach considers the communications channel noise attributable to crosstalk, white noise and analog to digital converter quantization noise, ISI attributable to failure of the equalizer coefficients to completely eliminate ISI, round off noise due to the use of finite precision arithmetic in the equalizer and roundoff noise due to the use of finite precision arithmetic in the FFT algorithm.

28 Claims, 4 Drawing Sheets

U.S. PATENT DOCUMENTS

| | | | |
|---|---|---|---|
| 5,715,280 A | 2/1998 | Sandberg et al. | 375/260 |
| 5,926,455 A | 7/1999 | Allpress | |
| 6,295,326 B1 | 9/2001 | Tonissen et al. | 375/350 |
| 6,388,513 B1 * | 5/2002 | Wright et al. | 330/2 |
| 6,788,752 B1 | 9/2004 | Andre | |
| 2002/0001355 A1 | 1/2002 | Tore | |
| 2002/0044014 A1 * | 4/2002 | Wright et al. | 330/2 |
| 2002/0131537 A1 * | 9/2002 | Storm et al. | 375/350 |

OTHER PUBLICATIONS

Chow, J., et al., "A Discrete Multitone Transceiver System for HDSL Applications", IEEE Journal on Selected Areas in Communications, vol. 9, No. 6, Aug. 1991.

Bellanger, M. G., "Adaptive Digital Filters and Signal Analysis", 1987, XP002169514, pp. 4–12 and 179–183.

Dalle Mese, et al., "Fixed–Lag Smoother for Digital Channel Equalisation", Electronic Letters, IEE Stevenage, vol. 13, No. 12, Jun. 9, 1977, p. 366–367, XP0000761143, ISSN: 0013–5194.

Chen, W. Y., "DSL: Simulation Techniques and Standards Development for Digital Subscriber Line Systems", 1988, XP002169513, pp. 8, 9, 11, 149–159.

Van Bladel, Mark and Moeneclaey, Marc, "Time–domain Equalization for Multicarrier Communication," IEEE Global Telecommunications Conference, Nov. 14, 1995, pp. 167–171.

Lashkarian, Navid and Kiaei, Sayfe, "Fast Algorithm for Finite–Length MMSE Equalizers with Application to Discrete Multitone Systems," IEEE International Conference on Acoustics, Speech, and Signal Processing, Mar. 15, 1999, pp. 2753–2756.

* cited by examiner

APPROACH FOR PROCESSING DATA RECEIVED FROM A COMMUNICATIONS CHANNEL IN FINITE PRECISION ARITHMETIC APPLICATIONS

RELATED APPLICATIONS

This application claims priority from U.S. Provisional Patent Application No. 60/173,785, entitled "METHOD AND APPARATUS FOR EQUALIZATION AND CROSSTALK MITIGATION IN A COMMUNICATION SYSTEM," filed Dec. 30, 1999 by Efstratios Skafidas and Shane Michael Tonissen, and U.S. Provisional Patent Application No. 60/173,778, entitled "METHOD AND APPARATUS FOR EQUALIZATION IN A COMMUNICATIONS RECEIVER USING FINITE PRECISION ARITHMETIC," filed Dec. 30, 1999 by A. Storm, Shane Michael Tonissen and Efstratios Skafidas, the contents of both which are incorporated herein by reference in their entirety for all purposes. This application is related to copending U.S. patent application Ser. No. 09/516,715, entitled "KALMAN FILTER BASED EQUALIZATION FOR DIGITAL MULTICARRIER COMMUNICATIONS SYSTEMS," filed Mar. 1, 2000, by Shane Michael Tonissen, Efstratios Skafidas and Andrew Logothetis.

FIELD OF THE INVENTION

The present invention relates generally to digital communications systems, and more specifically, to an approach for processing data received from a communications channel in finite precision arithmetic applications.

BACKGROUND OF THE INVENTION

There is a continuing need for higher performance digital data communications systems. Perhaps nowhere is this need more evident than on the worldwide packet data communications network now commonly referred to as the "Internet." On the Internet, the "richness" of content is constantly increasing, requiring an ever-increasing amount of bandwidth to provide Internet content to users. As a result of this increased demand for bandwidth, significant efforts have been made to develop new types of high-speed digital data communications systems. For example, optical fiber based networks are being built in many large metropolitan areas and undersea to connect continents. As another example, new wireless protocols are being developed to provide Internet content to many different types of small, portable devices.

One of the significant drawbacks of deploying many of these new types of high-speed digital data communications systems is the high cost and amount of time required to develop and build out the new infrastructure required by the systems. Because of these high costs, many new high-speed digital data communications systems are initially deployed only in densely populated areas, where the cost of building out the new infrastructure can be quickly recovered. Less populated areas must often wait to receive the new communications systems and some rural areas never receive the new systems where it is not cost effective to build the infrastructure.

For several reasons, significant efforts are being made to utilize conventional twisted pair telephone lines to provide high-speed digital data transmission. First, a significant amount of twisted pair telephone line infrastructure already exists in many countries. Thus, using conventional twisted pair telephone lines avoids the cost of building expensive new infrastructure. Second, conventional twisted pair telephone lines extend into customers' homes and businesses, avoiding the so-called "last mile" problem. As a result of recent development efforts in this area, several new communications protocols, such as ADSL, G.Lite and VDSL, have been developed for providing high-speed digital transmission over conventional twisted pair telephone lines.

Despite the advantages to using conventional twisted pair telephone lines to provide high-speed digital communications, there are some problems with this approach. First, conventional twisted pair telephone lines cause signal attenuation per unit length that increases rapidly with frequency. A moderate length twisted pair line, for example around fifteen thousand feet, may cause only a few decibels (dB) of attenuation in the voice band, for which the line was originally designed, but many tens of dB of attenuation at higher transmission frequencies, for example around 1.1 MHz for ADSL. This results in a transfer function with a wide dynamic range, making channel equalization more difficult. The transfer function is further complicated by bridge taps and impedance mismatches between line sections that cause reflections and echoes at the receiver. Furthermore, filtering performed at the transmitter and receiver also increases the complexity of the transfer function.

The standards for ADSL and G.Lite specify Discrete Multitone (DMT) modulation. DMT is also under consideration for use in VDSL systems. DMT modulation generally involves transmitting digital data on a number of carriers simultaneously. Modulation and demodulation are performed using a Fast Fourier Transform (FFT). A cyclic prefix is introduced to ensure separation between successive DMT symbols and eliminate inter-symbol interference (ISI). In practice, the cyclic prefix is necessarily quite short, generally much shorter than the impulse response of the communications channel. This often results in significant ISI being present in the received data. Large amounts of ISI cause a large reduction in the available communications bandwidth. This is especially true for long twisted pair telephone lines likely to be encountered in ADSL and VDSL communications systems. The effect of this ISI is to reduce the SNR in each bin of the FFT demodulator employed in a DMT system.

Standard equalizers used in digital communication systems, such as adaptive LMS and RLS equalizers, are generally inappropriate for DMT systems since they are not designed to eliminate ISI. The current state of the art in equalizer design has the objective of shortening the overall channel plus equalizer impulse response so that the overall response is shorter than the cyclic prefix length. Various attempts to meet this requirement have been made. See for example, *Optimal Filtering*, by B. D. O. Anderson and J. B. Moore, Prentice-Hall, 1979; and *A Multicarrier Primer*, by J. M. Cioffi. Determining equalizer coefficients is generally a computationally inefficient process and can be quite sensitive to noise, which limits the practical application of these techniques.

In addition to the equalization problem, twisted pair lines suffer from various forms of interference. Up to fifty twisted pairs are conventionally grouped together in binders. As a result, a signal on one pair can cause interference on other pairs in the same binder. This interference is called crosstalk and results in a reduced signal-to-noise ratio (SNR) at the receiver. Current approaches to mitigate crosstalk require access to the signal transmitted on the interfering line. This makes current approaches useful only in a central office environment, where the signals on all pairs in a binder are available. Thus, none of the existing crosstalk mitigation approaches are suitable when only the received signal is available.

Another problem is that conventional approaches for processing data received from a communications channel consider only the noise on the communications channel, leading to sub-optimal results. There is generally no consideration given to the frequency domain response of the equalizer and hence, there is no guarantee against SNR loss due to roundoff error in finite precision arithmetic. In addition to roundoff error in the equalizer, there is also roundoff error in the fast Fourier transform (FFT) used in DMT receivers. Prior channel equalization approaches do not take this source of noise into account. Where 16-bit fixed-point arithmetic is used in the FFT, the roundoff error in the FFT can be quite significant, and must be taken into account if overall SNR is to be maintained.

Based on the foregoing, there is a need for an approach for processing data received from a communications channel in finite precision arithmetic applications that does not suffer from the limitations of conventional approaches.

SUMMARY OF THE INVENTION

An approach for processing data received from a communications channel in finite precision arithmetic applications generally involves equalizing received data in the time domain prior to demodulation using finite impulse response (FIR) filtering. FIR coefficients used in FIR filtering are selected to minimize SNR degradation attributable to ISI and roundoff errors due to finite precision arithmetic, thereby maximizing channel capacity. The approach considers the communications channel noise attributable to crosstalk, white noise and analog to digital converter quantization noise, ISI attributable to failure of the equalizer coefficients to completely eliminate ISI, round off noise due to the use of finite precision arithmetic in the equalizer and roundoff noise due to the use of finite precision arithmetic in the FFT algorithm.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Various aspects and features of the approach described herein for processing data received from a communications channel are described in more detail in the following sections: (1) overview; (2) FIR filtering; (3) theoretical background of FIR filter coefficient estimation; (4) FIR filter coefficient estimation; and (4) implementation mechanisms.

1. Overview

An approach for processing data received from a communications channel in finite precision arithmetic applications generally involves equalizing received data in the time domain prior to demodulation using finite impulse response (FIR) filtering. It has been found that the noise contributions due to ISI, equalizer roundoff error, and FFT roundoff error can be modeled as white noise sources at the equalizer output. It follows that the shape of the equalizer frequency response is important, since if the equalizer response reduces the channel noise at a particular frequency to below that of the other noise sources, then the SNR in that tone or tones will be degraded. It has been observed that using the so-called optimal shortening filters, the ISI may be almost eliminated, however the equalizer can have a frequency response with a wide dynamic range resulting in SNR degradation due to roundoff noise. The approach described herein ensures this degradation is eliminated or at least minimized by including the equalizer frequency response in the optimization process. The result is a superior equalizer for use in communication receivers employing multi-carrier modulation. FIR coefficients used in the FIR filtering are selected to minimize SNR degradation attributable to ISI and roundoff errors due to finite precision arithmetic, thereby maximizing channel capacity. The approach described herein considers the communications channel noise attributable to crosstalk, white noise and analog to digital converter quantization noise, ISI attributable to failure of the equalizer coefficients to completely eliminate ISI, round off noise due to the use of finite precision arithmetic in the equalizer and roundoff noise due to the use of finite precision arithmetic in the FFT algorithm.

Figure 1:
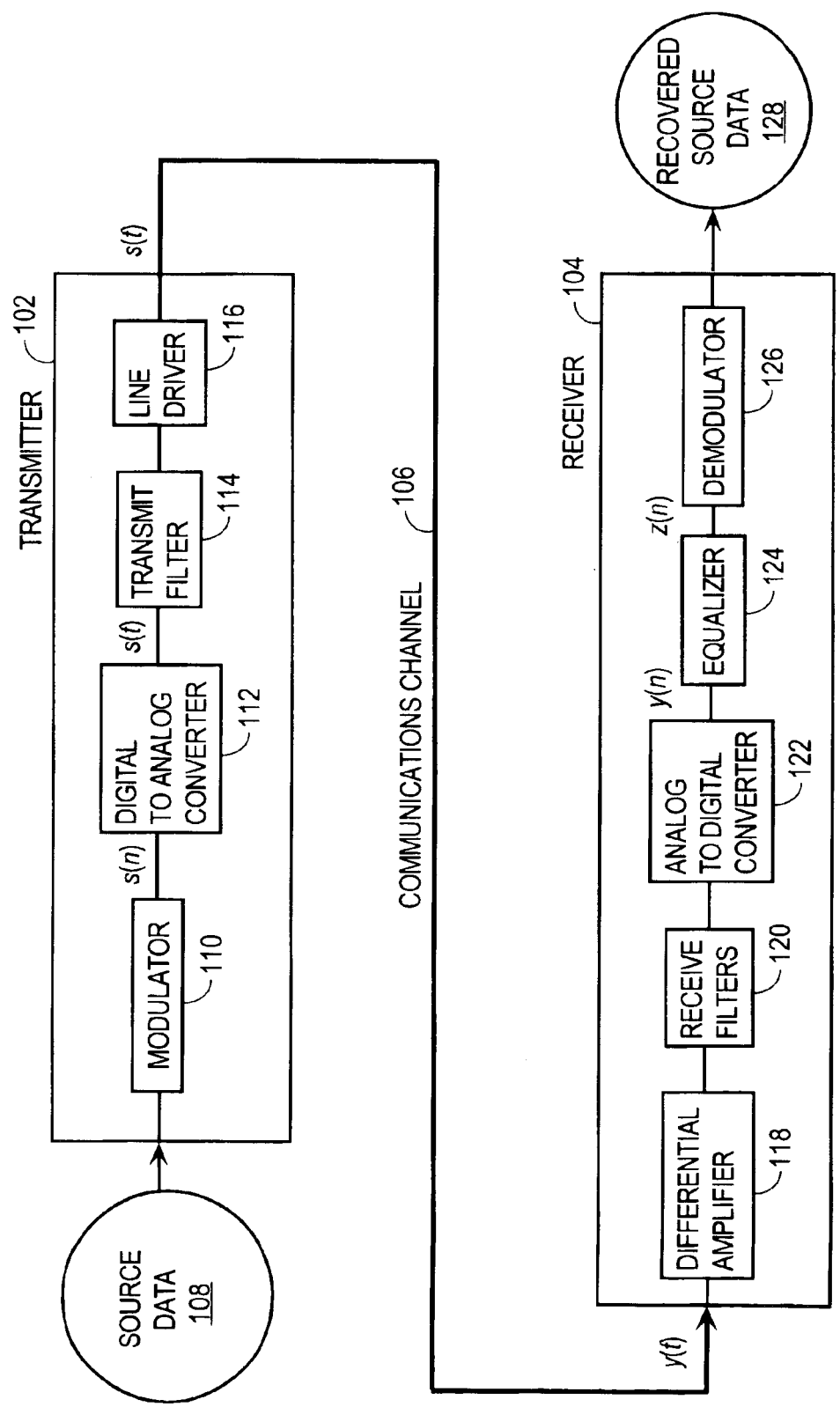
FIG. 1 is a block diagram of a conventional digital data communications arrangement.

FIG. 1 is a block diagram of a conventional communications system arrangement 100. Arrangement 100 includes a transmitter 102 communicatively coupled to a receiver 104 via a communications channel 106. Communications channel 106 may be any type of medium or mechanism for providing data from transmitter 102 to receiver 104. For purposes of explanation only, various embodiments of the invention are described herein in the context of communications channel 106 as a landline, such as one or more conventional twisted pair telephone lines.

Transmitter 102 receives digital source data 108, e.g., a digital stream, that is modulated by a modulator 110 to generate a sampled data signal s(n), where n is the sample number, and the sampling rate is given by $F_s$. The sampled data signal s(n) is converted to an analog signal s(t) by an digital to analog converter 112. The analog signal s(t) is processed by a transmit filter 114 to remove unwanted components from the analog signal s(t). The analog signal s(t) is then amplified by a line driver 116 and transmitted onto communications channel 106. It should be noted that the transmitted analog signal s(t) is not strictly a continuous time representation of the sampled data signal s(n) since transmit filter 114 modifies the signal, but is represented as such herein for the purposes of explanation. The transmitted analog signal s(t) passes through communications channel 106, which has an impulse response of h(t) and corresponding transfer function H(f). The output of communications channel 106 x(t) is the convolution of the transmitted analog signal s(t) and the channel impulse response h(t), given by $$x(t)=s(t)*h(t) \quad (1)$$

The signal received by receiver 104 y(t) is the sum of the output of communications channel 106 x(t) and an additive noise signal w(t), given by $$y(t)=x(t)+w(t) \quad (2)$$

where the additive noise signal w(t) consists of any form of interference introduced by communications channel 106, for example crosstalk, and an additive white Gaussian noise component.

A differential amplifier 118 processes the received signal y(t) to generate an amplified signal y(t). The amplified signal y(t) is then processed by one or more receive filters 120 to remove undesired components and generate a filtered signal y(t). The filtered signal y(t) is sampled by analog-to-digital converter 122 to generate a digital signal y(n) which at this point is still modulated. It should be pointed out that y(n) is not strictly a sampled version of y(t) due to the processing of receive filters 120 which modify the signal, but is represented as such herein for the purposes of explanation.

An equalizer 124 processes digital signal y(n) in the time domain to remove ISI and recover the transmitted modulated data z(n). A demodulator 126 processes the modulated data z(n), e.g., via an FFT, to generate recovered source data 128, which ideally very closely approximates source data 108.

Figure 2:
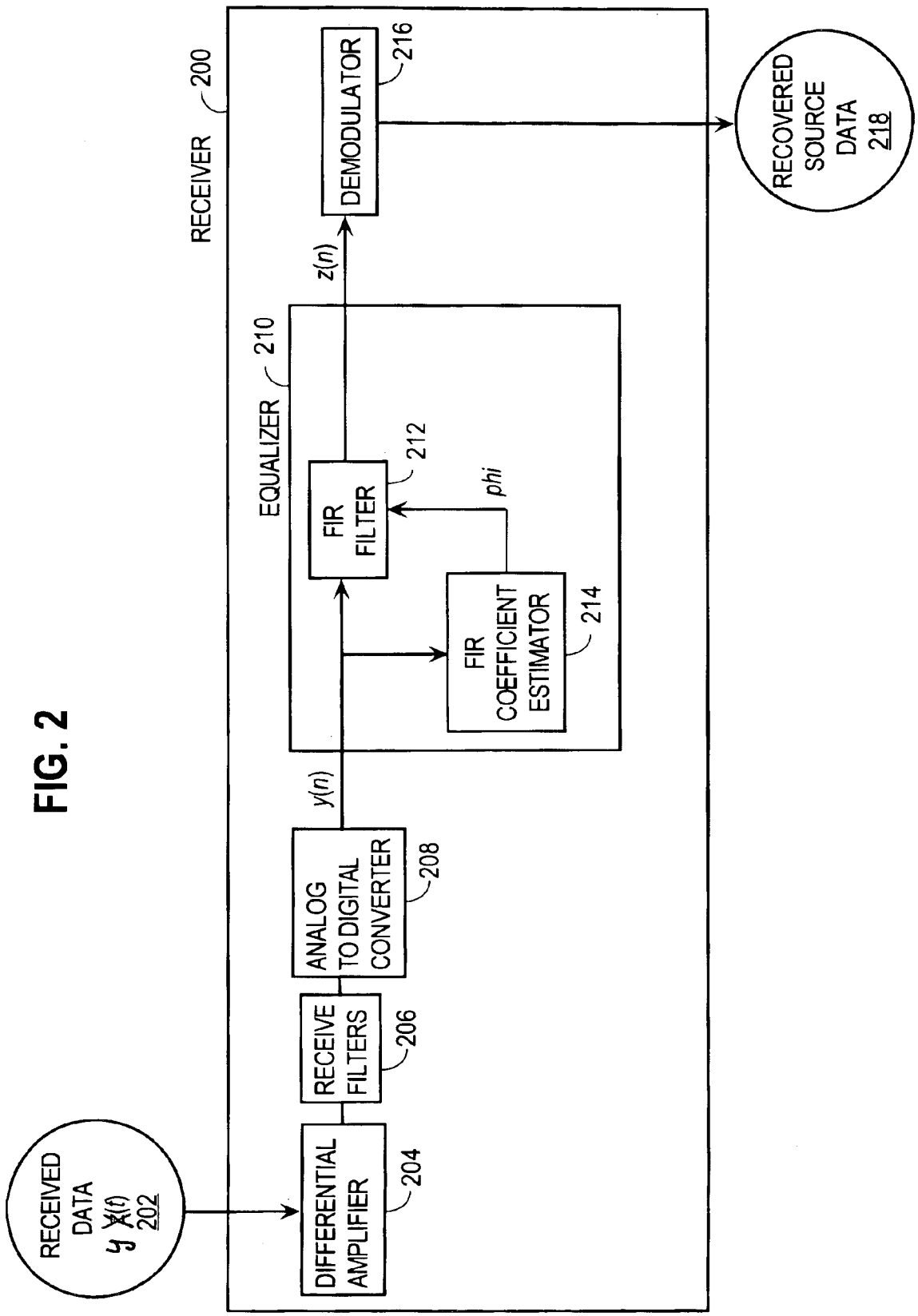
FIG. 2 is a block diagram of an arrangement for processing data received from a communications channel according to an embodiment of the invention.

FIG. 2 is a block diagram of a receiver 200 for processing received data y(t) 202 from communications channel 106 according to an embodiment of the invention. As with the conventional arrangement 100 of FIG. 1, received data y(t) 202, obtained from communications channel 106, is the sum of the output of communications channel 106 x(t) and an additive noise signal w(t). The received data y(t) 202 is processed by a differential amplifier 204, one or more receive filters 206 and an analog-to-digital converter 208 to produce a sampled signal y(n), where n is the sample number.

The sampled signal y(n) is provided to an equalizer 210 that produces an estimate z(n) of the sampled communications channel 106 input signal that is provided to a demodulator 216. Demodulator 216 recovers an estimate of the original source data 108 in the form of recovered source data 218.

According to one embodiment of the invention, equalizer 210 includes a finite impulse response (FIR) filter 212 and an FIR coefficient estimator 214. FIR filter 212 processes the sampled signal y(n) to produce the estimate z(n) of the sampled communications channel 106 input signal. FIR coefficient estimator 214 determines the coefficients required by FIR filter 212. According to one embodiment of the invention, the coefficients for FIR filter 212 are selected such that ISI is eliminated, while any potential SNR loss due to finite precision arithmetic is minimized.

Figure 3:
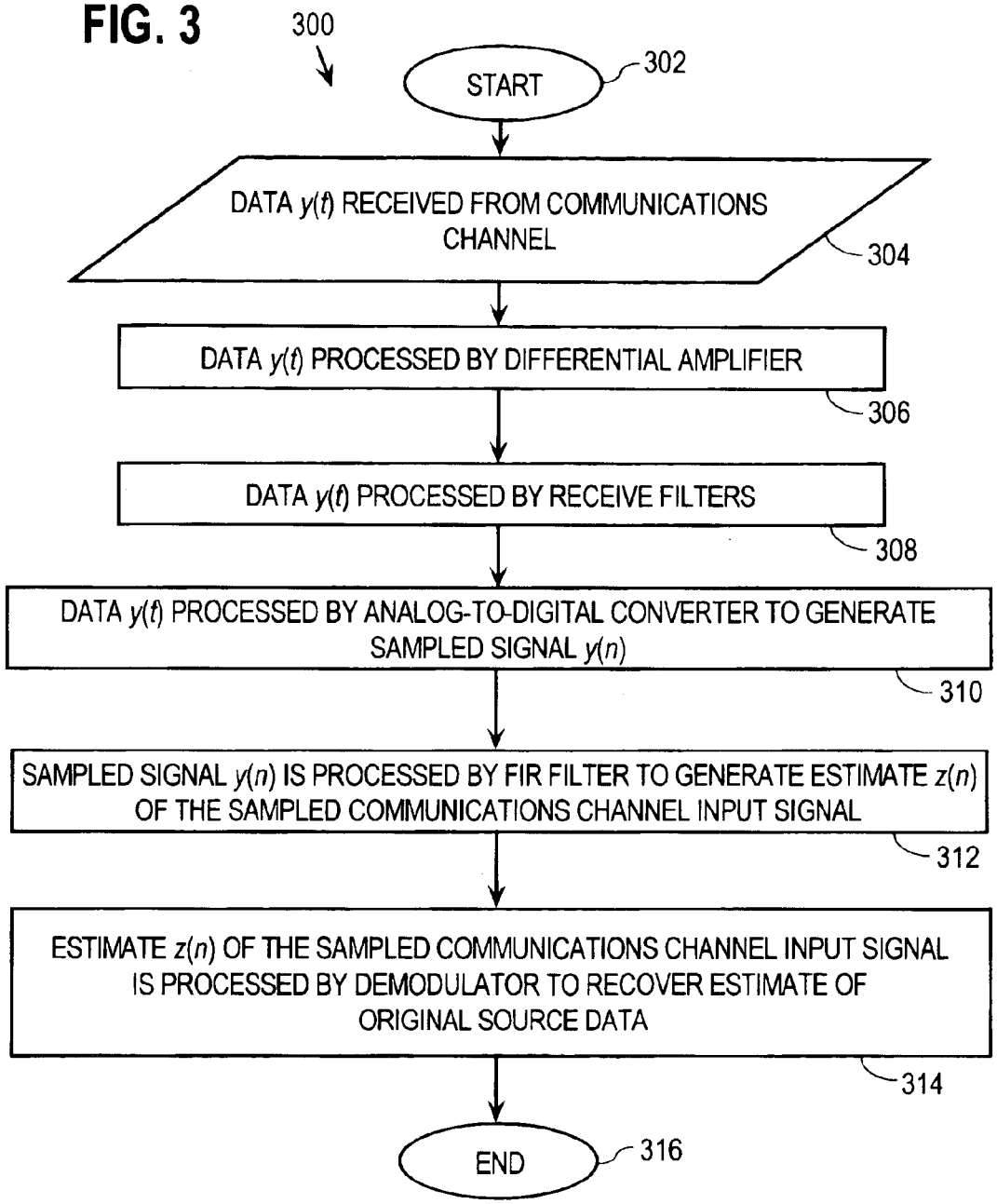
FIG. 3 is a flow diagram of an approach for processing data received from a communications channel according to an embodiment of the invention.

FIG. 3 is a flow diagram 300 that illustrates an approach for processing data received from a communications channel according to an embodiment of the invention. After starting in step 302, in step 304, received data y(t) is received from communications channel 106. In step 306, the received data y(t) is processed by differential amplifier 204 to generate amplified data y(t). In step 308, the amplified data is processed by the one or more receive filters 206 to generate filtered data y(t).

In step 310, the filtered data y(t) is sampled by analog-to-digital converter 208 to generate an sampled signal y(n). In step 312, the sampled signal y(n) is processed by FIR filter 212, which generates an estimate z(n) of the sampled communications channel 106 input signal. In step 314, the estimate z(n) of the sampled communications channel 106 input signal is provided to a demodulator 216 that recovers an estimate of the original source data 108 in the form of recovered source data 218. The process is complete in step 316.

2. FIR Filtering

As previously described herein, equalization is performed using FIR filter 212. The number of taps p+1 in FIR filter 212 is generally chosen based upon the requirements of a particular application. According to one embodiment of the invention, at least sixteen taps are used to ensure adequate equalizer results, particularly for longer loops. The samples of the input signal to FIR filter 212 are denoted by y(n), where n is the sample number. FIR filter 212 filters the sampled signal y(n) to form the filtered signal z(n) provided to demodulator 216, such that $$z(n) = \sum_{i=0}^{P} \varphi(i)y(n-i) \quad (3)$$

where $\{\phi(i), i=0, \ldots, p\}$ is the set of FIR filter coefficients, and $\phi(0)=1$ by definition.

The FIR filter equation (3) is the standard form of an FIR filter.

3. Theoretical Background of FIR Filter Coefficient Estimation

FIR filter coefficient estimator 214 estimates the set of FIR coefficients, denoted by $\{\phi(i): i=0, \ldots, p\}$, for use in FIR filter 212. Using the approach described herein in this application, the coefficients are determined such that the number of bits per DMT symbol is maximized for the given channel conditions. This is achieved by determining coefficients that minimize SNR degradation attributable to ISI and roundoff errors due to finite precision arithmetic. The optimal equalizer coefficients are given by $$\varphi_{opt} = \arg\max_{\varphi} B(\varphi) \quad (4)$$

where $B(\phi)$ is the number of bits per DMT symbol when communications channel is equalized by an equalizer with coefficients $\phi$. In principle, the optimization is performed over all possible equalizers $\phi$ of order less than or equal to some maximum order $P_{max}$. In practice, the set of equalizers over which the search is performed must be restricted to a subset of all equalizers to make the optimization computationally feasible. For a given equalizer, the number of bits per symbol is given by $$B(\varphi) = \sum_{k=0}^{N-1} \min\left(b_{\max}, \text{floor}\left(\frac{\min(b_k(\varphi), b_{\min})}{b_{\min}}\right)b_k(\varphi)\right) \quad (5)$$

where N is the number of tones in a DMT symbol, and $b_k$ is the theoretical number of bits in tone k for a particular equalizer $\phi$ and is given by $$b_k(\varphi) = \text{floor}\left(\log_2\left(1 + \frac{SNR_k(\varphi)}{\Gamma}\right)\right) \quad (6)$$

with the floor function restricting the number of bits to integer values. The summation in (5) further restricts the number of bits per tone to lie between some minimum and maximum values $b_{min}$ and $b_{max}$ respectively. For example, in an ADSL application $b_{min}=2$ and $b_{max}=15$. The value of $\Gamma$ is determined by the required margin for a specified bit error probability and additional noise margin. The ADSL standard specifies a bit error probability of 1×10$^{-7}$, requiring a margin Γ=9.8 dB, with an additional 6 dB noise margin. Hence in (6), the value of Γ=10$^{(15.8/10)}$=38.0 for an ADSL implementation. Equation (6) further indicates that the number of bits in tone k depends on SNR$_k$(φ), the SNR in tone k for a given equalizer φ, given by $$SNR_k(\varphi) = \frac{S_k|H_k|^2|\Phi_k|^2}{(|\Phi_k|^2 N_k - N_{ISI}(\varphi) + N_{FFT} - N_{EQ})} \quad (7)$$

with received signal power in tone k given by $S_k|H_k|^2$, the magnitude of the equalizer frequency response in tone k given by $|\Phi_k|$, with $$\Phi_k = \sum_{i=0}^{P} \varphi(l) \exp\left(\frac{-j2\pi kl}{M}\right) \quad (8)$$

where M=2N is twice the number of tones. It is also possible to compute $\Phi_k$ using the FFT, which is more efficient when p becomes large.

The equation for SNR$_k$(φ) given in (7) includes all of the noise sources present at the equalizer outputs. The first component is the channel noise referred to the equalizer output, given by $|\Phi_k|^2 N_k$. This is the only component considered in prior approaches, such as those described in *Optimum Finite-Length equalization for Multicarrier Transceivers*, by N. Al-Dhahir and J. M. Cioffi, IEEE Transactions on Communications, Pages 56–63, January 1996. The second component, which depends on the equalizer choice φ, is the ISI noise given by N$_{ISI}$(φ). The ISI is modeled as a white noise source at the equalizer output. Although this is only an approximation, sufficient accuracy can be achieved by application of a suitable bound. The bound is obtained by computing the energy in the overall communications channel plus equalizer impulse response that falls outside the cyclic prefix samples.

The other additional noise terms considered are N$_{FFT}$ and N$_{EQ}$ corresponding to noise due to roundoff errors caused by finite precision arithmetic in the FFT (used for DMT demodulation) and equalizer respectively. Since most high-speed digital communication systems employ fixed-point processors with as little as 16-bit precision, these additional noise terms can become significant. The penalty for ignoring them, as has been the case in all previous equalizer designs, has been to suffer a SNR degradation, and hence a reduction in achievable bit rate. The discussion in *Digital Signal Processing*, by A. V. Oppenheim and R. W. Schafer, Prentice-Hall International, 1975, describes how noise power can be computed both for FIR filters (the equalizer) and various FFT implementations. Specific examples for these computations are provided hereinafter.

As stated, the optimization in (4) should be performed over all possible equalizers φ. However, it is generally not possible to obtain a computationally efficient procedure for achieving this, so an alternative procedure is described that limits the search space. The approach described herein is based on several observations regarding equation (7):

a. There is an upperbound for the SNR, which occurs when $|\Phi_k|^2 N_k >> N_{ISI}(\varphi) + N_{FFT} + N_{EQ}$. That is, when the term due to the noise at the receiver input dominates all other noise sources. The upperbound on SNR$_k$ is then given by $$\max(SNR_k) = \frac{S_k|H_k|^2}{N_k} \quad (9)$$

which is simply the SNR at the input to the receiver. Hence the equalizer cannot improve the SNR in any tone, but inappropriate choice of φ can lead to SNR degradation. Hence the equalizer must be designed to keep the contribution from the additional noise sources less than the contribution of the noise on the communications channel.

b. The ISI noise, N$_{ISI}$(φ), must be made as small as possible in order to avoid any possibility of SNR degradation. This can be achieved by designing the equalizer to shorten the overall impulse response of channel plus equalizer.

c. The equalizer frequency response is critical in preventing SNR degradation, since if $|\Phi_k|^2$ becomes small in any tone k, particularly if N$_k$ is also small, it is quite likely $|\Phi_k|^2 N_k$ can be less than the contribution from N$_{FFT}$ and N$_{EQ}$, even if N$_{ISI}$(φ) is negligible. This is because the noise components due to roundoff error tend to be relatively constant and independent of the equalizer response. Hence if the equalizer attenuates the signal in any given tone, the roundoff errors can become significant in that tone, eventually leading to SNR degradation. This problem is avoided by determining equalizer coefficients that minimize the attenuation. This, in turn, is achieved by minimizing the variation in the equalizer frequency response.

As a result of these observations, an alternative optimization has been defined to reduce the search space, with the optimization in (4) then performed over the subset of equalizers determined from the first optimization. This second optimization is set up as follows: First, let $$(h_t)_{t=0}^{\lambda-1}$$

be the communications channel impulse response, or an estimate of this, and let (1, φ$_1$, . . . , φ$_p$) be the vector of equalizer coefficients. The equalized impulse response is $$H = \sum_{K=0}^{P} p_k h_{t=k}.$$

impulse response shortening may be achieved by choosing φ=($_1$, . . . , φ$_p$) to minimize the cost function $$C(\varphi) = \sum_{t=q+1}^{\lambda-1} |g_t|^2 = r + 2\varphi' f + \varphi' F \varphi \quad (10)$$

where $$r = \sum_{t=g+1}^{\lambda-1} h_t^2 \quad (11)$$

$$f_i = \sum_{t=q+1}^{\lambda-1} h_t h_{t-i} \quad (12)$$

-continued $$F_{ij} = \sum_{t=q+1}^{\lambda-1} h_{t-i} h_{t-j} \quad (13)$$

are calculated for $1 \leq ij \leq p$ and where it is understood that $h_t=0$ if $t<0$. This cost function is simply the energy in the equalized response $g_t$ that falls outside the target length q, where q is usually chosen to be equal to the cyclic prefix length v, but can be chosen to be shorter if desired. Optimizing $C(\phi)$ yields an equalizer that minimizes ISI, but that can yield an arbitrary equalizer frequency response, potentially giving rise to SNR degradation in some tones.

At this point it is noted that it is assumed the origin for the impulse response h has been chosen so that $h_O$ is the first non-zero sample of the response. If this is not the case, then the origin of the impulse response should be moved accordingly, otherwise performance is adversely affected. Shifting the origin is a straightforward process that can be implemented in a variety of ways, for example, by finding the set of q+1 samples of the response that contain the greatest energy.

An additional term for the cost function is then derived to ensure the variation in the equalizer frequency response is minimized. To express the range of the equalizer frequency response, first let $\Phi_k = \phi_t \exp(-j2\pi kt/M)$ be the equalizer response at tone k for $0 \leq k \leq N-1$, with $M=2N$, and N being the number of tones (256 for an ADSL downstream implementation). In practice, the SNR is often too low for data transmission in a number of tones, so it is unnecessarily restrictive to minimize the variation over all tones. Instead, the variation is minimized over a set of tones T. A suitable set of tones may be defined a-priori if it is known that a number of tones will not be used, for example because of an FDM filter separating upstream and downstream transmissions. The range of $\Phi_k$ over a set of tones T may be expressed by the simple variance formula $$R(\varphi) = \sum_{k \in T} |\Phi_k - \overline{\Phi}|^2 = \sum_{k \in T} |\Phi_k|^2 - |T||\overline{\Phi}|^2 \quad (14)$$

where $\overline{\Phi} = \frac{1}{|T|} \sum_{k \in T} \Phi_k$.

and $|T|$ is the number of tones in the set T.

Before combining this with $C(\phi)$ to obtain a new cost function, it is preferable to express R as a quadratic function of $\phi$:

$$\sum_{k \in T} |\Phi_k|^2 = \sum_{k \in T} \sum_{n=0}^{p} \sum_{m=0}^{p} \varphi_n \varphi_m \exp(-j2\pi k(n-m)/M) \quad (15)$$

$$= \sum_{n=0}^{p} \sum_{m=0}^{p} \varphi_n \varphi_m \sum_{k \in T} \exp(-j2\pi k(n-m)/M) \quad (16)$$

$$|\overline{\Phi}|^2 = \frac{1}{|T|^2} \sum_{k \in T} \sum_{l \in T} \sum_{n=0}^{p} \sum_{m=0}^{p} \varphi_n \varphi_m \exp(-j2\pi(kn-lm)/M) \quad (17)$$

$$= \frac{1}{|T|^2} \sum_{n=0}^{p} \sum_{m=0}^{p} \varphi_n \varphi_m \sum_{k \in T} \sum_{l \in T} \exp(-j2\pi(kn-lm)/M) \quad (18)$$

so that $$R(\varphi) = \sum_{n=0}^{p} \sum_{m=0}^{p} \varphi_n \varphi_m \left( \sum_{k \in T} \exp(-j2\pi k(n-m)/M) - \frac{1}{|T|} \sum_{k \in T} \sum_{l \in T} \exp(-j2\pi(kn-lm)/M) \right) \quad (19)$$

$$= \sum_{n=0}^{p} \sum_{m=0}^{p} \varphi_n \varphi_m \left( \sum_{k \in T} \cos(2\pi k(n-m)/M) - \frac{1}{|T|} \sum_{k \in T} \sum_{l \in T} \cos(2\pi(kn-lm)/M) \right) \quad (20)$$

$$= \sum_{n=1}^{p} \sum_{m=1}^{p} \varphi_n \varphi_m \left( \sum_{k \in T} \cos(2\pi k(n-m)/M) - \frac{1}{|T|} \sum_{k \in T} \sum_{l \in T} \cos(2\pi(kn-lm)/M) \right) \quad (21)$$

$$= \varphi' A \varphi \quad (22)$$

where the elements of matrix A are the bracketed terms in the above expression. When T is a contiguous range of tones, $T=\{k: a \leq k \leq b\}$, the summations may be evaluated via the relation $$\sum_{k=a}^{b} \cos(2\pi kt/M) = \frac{\sin(2\pi(b+1/2)t/M) - \sin(2\pi(a-1/2)t/M)}{2\sin(\pi t/M)} \quad (23)$$

if $t \neq 0$, $$\sum_{k=a}^{b} \cos(2\pi kt/M) = b - a + 1 \text{ if } t = 0. \quad (24)$$

The two cost functions are combined to obtain:

$$D(\varphi) = C(\varphi) + \mu R(\varphi)/M \quad (25)$$
$$= r + 2\varphi' f + \varphi' F \varphi + (\mu r/M)\varphi' A \varphi$$

which is minimized by choosing $$\phi = -(F + (\mu r/M)A)^{-1} f \quad (27)$$

The number $\mu$ is a weighting factor that is chosen by the user to allow variation in the importance of the dynamic range penalty term $(\mu r/M)\phi' A \phi$. Generally $\mu$ is kept small, e.g. less than 0.5. Choosing a large value for $\mu$ (e.g. 10 or more) gives small dynamic range with poor impulse response shortening. It is seen that the optimal equalizer in (27) depends on both the weighting factor $\mu$ and the equalizer order p. If the optimization in (27) is performed for a range of both $\mu$ and p, the resulting equalizers $\phi(\mu, p)$ form a reduced set of equalizers over which the original optimization in (4) is then performed by direct substitution.

One special case of interest in when the set of tones T consists of the entire range $0 \leq k \leq N-1$, and the matrix A reduces to the identity. In this case, the additional penalty term reduces to adding a constant to the diagonal of F, and becomes computationally trivial.

The following section describes a practical approach for obtaining the equalizer $\phi$. In practice it may be found that one particular choice of $\mu$ and p provides good performance over a wide range of channels likely to be encountered in practice. In such a case, it is only necessary to perform the optimization in (27) once, with the resulting used in the FIR equalizer without need to perform the optimization in (4).

4. FIR Filter Coefficient Estimation

According to one embodiment of the invention, the FIR filter coefficients used by FIR filter 212 are determined as follows:

a. Estimate the channel frequency response $H_k$ in each tone. This is carried out during part of an initialization and training sequence, where a known symbol sequence is transmitted on a repeated basis. $H_k$ is estimated as follows:

(i) Let $$(d_k)_{k=0}^{M-1}$$

be the repeatedly transmitted Hermitian symmetrised symbol block (prior to modulation). In an ADSL system, one of the C_REVERB sequences can be used to estimate the downstream channel transfer function. Let $S_k = |d_k|^2$ for $k=0 \ldots N-1$ be the transmitted signal power in tone k. Here N is the number of tones, and M is the number of samples in the FFT used for modulation and demodulation. In general, $S_k$ will be constant for a training sequence.

(ii) Let $y_n$, n=0, 1, 2 ... L be the sequence of received signal blocks, prior to demodulation. Each block $y_n$ is a vector of length M, consisting of the M received samples corresponding to the $n^{th}$ transmitted training symbol, and L is the total number of training symbols on which the transfer function is to be estimated. The demodulated signal corresponding to this block is given by $$Y_n = FFT(y_n) \tag{28}$$

(iii) Discard $Y_0$ to avoid end effects, and calculate the average received symbol $$\overline{Y} = \frac{1}{L} \sum_{n=1}^{L} Y_n \tag{29}$$

and the average magnitude squared for each tone $$\overline{Z}_k = \frac{1}{L} \sum_{n=1}^{L} |Y_{nk}|^2 \tag{30}$$

These can both be computed via appropriate recursive formulae to avoid overflow problems.

(iv) Finally, compute the estimate of the channel transfer function according to $$H_k = \frac{\overline{Y}_k}{d_k} \tag{31}$$

for $1 \leq k \leq N-1$ and $N+1 \leq k \leq M-1$, with $H_0 = H_N = 0$ since no data is transmitted at DC or Nyquist frequency. An alternative approximation is to interpolate values for $H_0$ and $H_N$ from the adjacent values of the transfer function to avoid discontinuities.

b. Compute the estimated channel impulse response, given by $$h = Re(IFFT(H)) \tag{32}$$

c. Compute an estimate of the noise power in each tone k, given by $$N_k = Z_k - |Y_k|^2 \tag{33}$$

for $0 \leq k \leq N-1$. The theoretical SNR can then be calculated as $$SNR_k = \frac{S_k |H_k|^2}{N_k} \tag{34}$$

and as described earlier, this forms an upperbound for the achievable SNR in tone k.

d. Select a range of values for the equalizer order p, and the equalizer frequency response weighting factor $\mu$. These ranges are chosen such that a sensible range of potential equalizers is determined for which the bits per symbol can be optimized. In practice it may be sufficient to choose just one value for p, and one value for $\mu$ that represent a reasonable compromise for all likely channels.

e. Commencing with the first pair of values for $\mu$ and p, compute $f_i$ and $F_{ij}$ as given in (12) and (13).

f. Compute the equalizer frequency response penalty matrix A using the equations (19) to (24).

g. Solve the matrix equation $$\left(F + \frac{\mu r}{M} A\right)\varphi = -f \tag{35}$$

or the equivalent inverse formula in (27). According to one embodiment of the invention, the above equation is solved using a Cholesky decomposition to ensure robustness, as the inverse formula can lead to instability due to the possibility of inverting a near-singular matrix. The resulting equalizer $\phi(\mu,p)$ minimizes the cost function $D(\phi)$ in (25) for the particular choice of $\mu$ and p.

h. Repeat the preceeding steps to obtain an optimal equalizer $\phi(\mu,p)$ for each value of $\mu$ and p in the selected ranges. The equalizer to be used is then chosen as the equalizer which maximize the number of bits per DMT symbol, $B(\phi)$. It should be noted that for successive values of p, only $f_p$ and the last row of F,$F_{pj}$ needs to be computed. The remaining values remain the same.

i. For each pair of values $\mu$ and p, compute the equalizer frequency response at each tone according to (8), or using the FFT with $\phi$ padded with zeros to be of length M.

j. Let $$S = \frac{1}{N} \sum_{K=0}^{N-1} S_k$$

be the mean signal power, and compute $m = r + \phi'f$, where r is given in (11) and f is given in (12). Now compute $$N_{ISI}(\varphi) = \frac{2mS}{M(\lambda - q - 1)} \left( \sum_{t=v+1}^{M-1} t - v \right) = 2Sm/M. \tag{36}$$

This is an estimate of the residual intersymbol interference at the output of the equalized channel.

k. Compute estimates for the FFT and equalizer noise powers. These are dependent on the exact implementation of the finite precision arithmetic, with the following values derived for the special case where 16-bit fixed-point (integer) arithmetic is used. For M=512 point FFTs, and no intermediate scaling in the FFT, a suitable expression for $N_{FFT}$ is $$N_{FFT} = \frac{M}{12} \qquad (37)$$

while for an equalizer with p+1 taps, the first of which is set to 1, with 16 bit fixed point (integer) arithmetic a suitable expression for $N_{EQ}$ is $$N_{EQ} = \frac{p}{12} \qquad (38)$$

where it is noted that in general the equalizer noise is insignificant compared to the FFT noise, and rounding has been used as opposed to truncation. It is assumed appropriate normalization has been used throughout to compute the transfer functions and noise powers.

l. Compute the SNR in each tone k according to (7), compute the number of bits on each tone according to (6), and finally, compute the number of bits per DMT\symbol B($\phi$) according to (5).

m. From the set of possible equalizers $\phi(\mu,p)$, choose the equalizer $\phi$ for which B($\phi$) is maximized. If more than one equalizer yields the same performance, the equalizer with lower order p is chosen.

The equalizer resulting from the foregoing approach for estimating the FIR coefficients provides a DMT system for which the number of bits per DMT symbol is maximized, having taken account of all possible sources of additional noise in the system. Most notably, additional noise due to finite precision arithmetic has been taken into account, ensuring minimization of SNR loss due to finite precision arithmetic.

9. Implementation Mechanisms

The approach described in this document for processing data received from a communications channel may be implemented in a receiver, such as receiver 200, or may be implemented into a stand-alone mechanism. The functionality of the elements depicted in FIG. 2 may be implemented separately or in various combinations, depending upon the requirements of a particular application, and the invention is not limited to any particular implementation. Furthermore, the approach described herein for processing data received from communications channel 106 may be implemented in computer software, in hardware circuitry, or as a combination of computer software and hardware circuitry. Accordingly the invention is not limited to a particular implementation.

Figure 4:
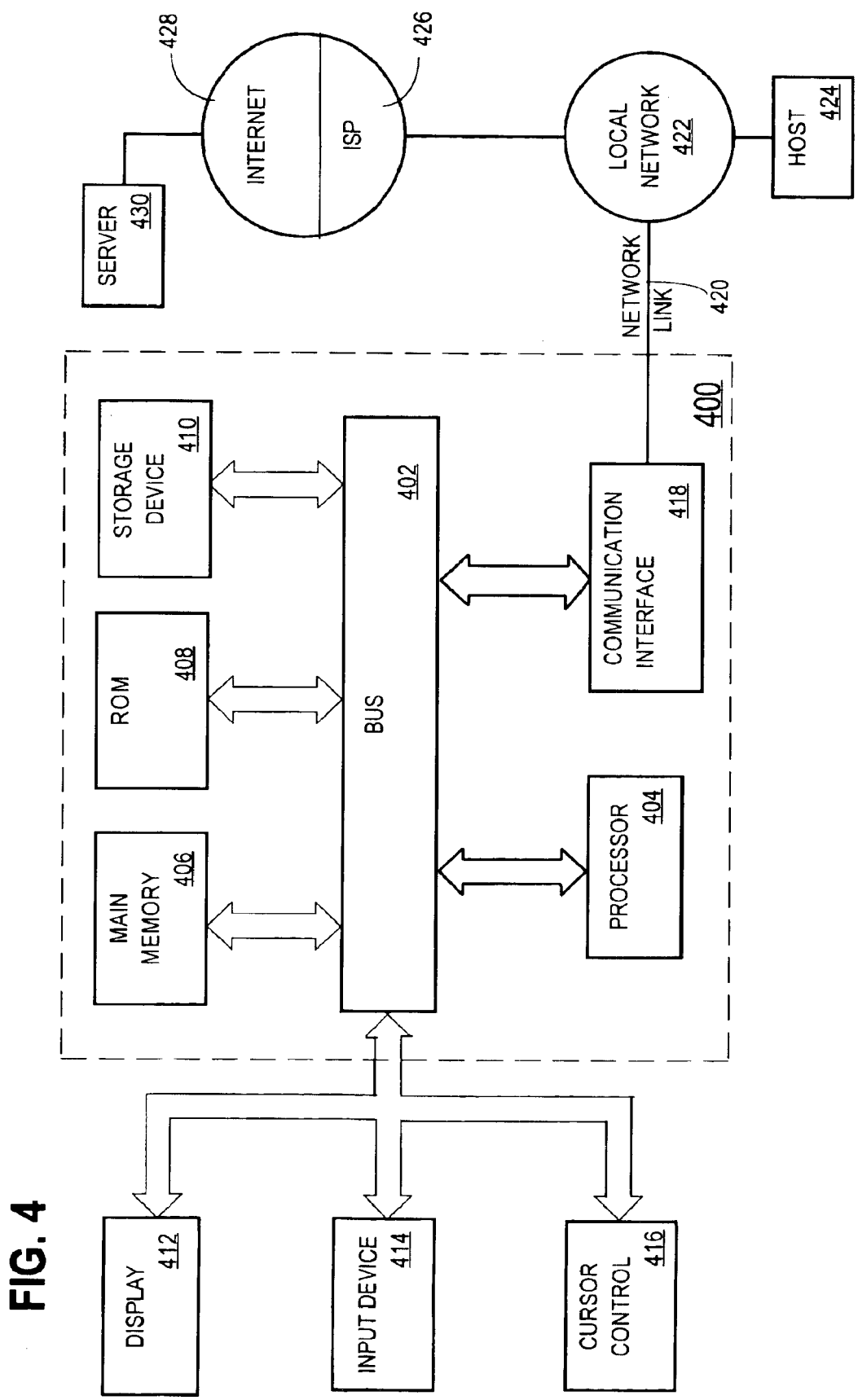
FIG. 4 is a block diagram of a computer system on which embodiments of the invention may be implemented.
Figure 2:
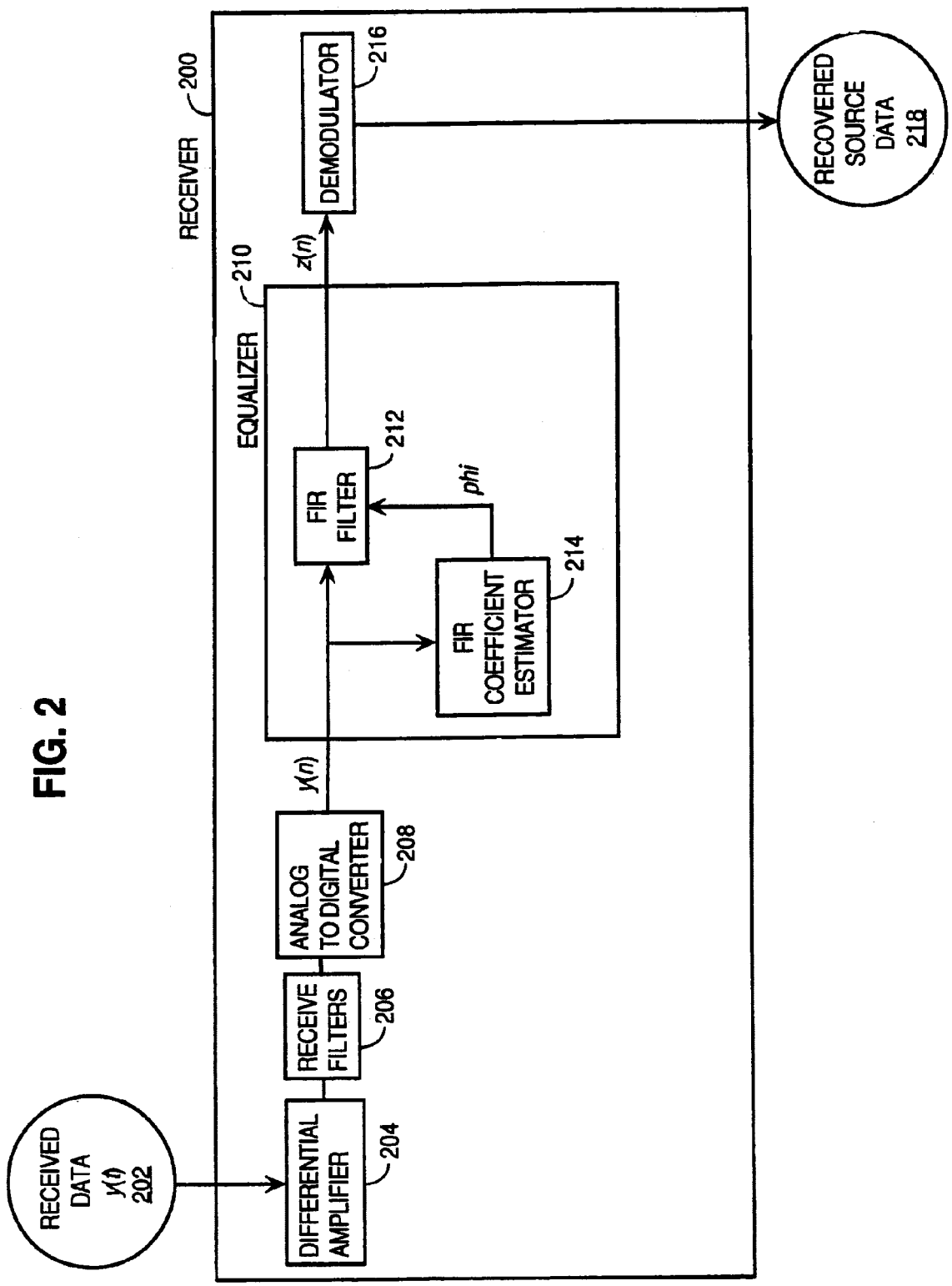

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for processing data received from a communications channel in finite precision arithmetic applications. According to one embodiment of the invention, processing data received from a communications channel in finite precision arithmetic applications is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for the processing of data received from a communications channel in finite precision arithmetic applications as described herein.

The received code may be executed by processor 404 as it is received, and/or stored in storage device 410, or other non-volatile storage for later execution. In this manner, computer system 400 may obtain application code in the form of a carrier wave.

The approach described herein for processing data received from a communications channel in finite precision arithmetic applications provides significant advantages over prior approaches. The approach describe herein enables the equalizer coefficients to be determined such that ISI is eliminated, while minimizing any potential SNR loss attributable to the use of finite precision arithmetic. Specifically, the number of bits per DMT symbol is maximized, while taking into account of all possible sources of additional noise in the system. In addition, the approach is efficient and robust, ensuring that the equalizer is suitable for use in real-time systems that employ high sample rates.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing data received from a communications channel comprising the computer-implemented steps of:

receiving, from the communications channel, received data that is based upon both modulated data and distortion introduced by the communications channel, wherein the modulated data is the result of original data modulated onto one or more carriers;

equalizing the received data using an equalizer to generate equalized data, wherein the equalizer uses an algorithm with a set of one or more coefficients selected to account for a frequency domain response of the equalizer and to reduce the distortion introduced by the communications channel; and recovering an estimate of the original data by demodulating the equalized data.

2. The method as recited in claim 1, wherein the step of equalizing the received data includes processing the received data using a finite impulse response (FIR) filter.

3. The method as recited in claim 2, wherein the received data is modulated using discrete multitone modulation and a set of one or more (FIR) coefficients for the finite impulse response filter is selected to maximize, in the equalizer, the numbers of bits used to represent each discrete multitone symbol.

4. The method as recited in claim 1, wherein the method further comprises processing the received data using an analog-to-digital converter and the set of one or more coefficients is further selected to account for quantization noise in the analog-to-digital converter.

5. The method as recited in claim 1, wherein the communications channel is a twisted pair telephone line.

6. A method for processing data received from a communications channel comprising the computer-implemented steps of:

receiving, from the communications channel, received data that is based upon both modulated data and distortion introduced by the communications channel, wherein the modulated data is the result of original data modulated onto one or more carriers using a cyclic prefix;

equalizing the received data using an equalizer to generate equalized data, wherein the equalizer uses finite precision arithmetic to implement an algorithm with a set of one or more coefficients selected to account for a frequency domain response of the equalizer and to compensate for round off errors attributable to the use of the finite precision arithmetic in the equalizer; and recovering an estimate of the original data by demodulating the equalized data.

7. The method as recited in claim 6, wherein the set of one or more coefficients is determined based upon modeling noise attributable to the round off errors as a white noise source at an output of the equalizer.

8. A method for processing data received from a communications channel comprising the computer-implemented steps of:

receiving, from the communications channel, received data that is based upon both modulated data and distortion introduced by the communications channel, wherein the modulated data is the result of original data modulated onto one or more carriers using a cyclic prefix;

equalizing the received data using an equalizer to generate equalized data, wherein the equalizer uses finite precision arithmetic to implement an algorithm with a set of one or more coefficients selected to account for a frequency domain response of the equalizer and to compensate for round off errors attributable to the use of the finite precision arithmetic to demodulate the equalized data; and recovering an estimate of the original data by demodulating the equalized data.

9. The method as recited in claim 8, wherein the step of demodulating the equalized data includes the use of a fast fourier transfer algorithm and the set of one or more coefficients is selected to compensate for round off errors attributable to the use of the finite precision arithmetic to implement the fast fourier transfer algorithm.

10. A computer-readable medium carrying one or more sequences of one or more instructions for processing data received from a communications channel, wherein the processing of the one or more sequences of one or more instructions by one or more processors cause the one or more processors to perform the steps of:

receiving, from the communications channel, received data that is based upon both modulated data and distortion introduced by the communications channel, wherein the modulated data is the result of original data modulated onto one or more carriers;

equalizing the received data using an equalizer to generate equalized data, wherein the equalizer uses an algorithm with a set of one or more coefficients selected to account for a frequency domain response of the equalizer and to reduce the distortion introduced by the communications channel; and recovering an estimate of the original data by demodulating the equalized data.

11. The computer-readable medium as recited in claim 10, wherein the step of equalizing the received data includes processing the received data using a finite impulse response (FIR) filter.

12. The computer-readable medium as recited in claim 11, wherein the received data is modulated using discrete multitone modulation and a set of one or more (FIR) coefficients for the finite impulse response filter is selected to maximize, in the equalizer, the numbers of bits used to represent each discrete multitone symbol.

13. The computer-readable medium as recited in claim 10, wherein the computer-readable medium includes one or more additional instructions which, when executed by the one or more processors, cause the one or more processors to process the received data using an analog-to-digital converter and the set of one or more coefficients is further selected to account for quantization noise in the analog-to-digital converter.

14. The computer-readable medium as recited in claim 10, wherein the communications channel is a twisted pair telephone line.

15. A computer-readable medium carrying one or more sequences of one or more instructions for processing data received from a communications channel, wherein the processing of the one or more sequences of one or more instructions by one or more processors cause the one or more processors to perform the steps of:

receiving, from the communications channel, received data that is based upon both modulated data and distortion introduced by the communications channel, wherein the modulated data is the result of original data modulated onto one or more carriers;

equalizing the received data using an equalizer to generate equalized data, wherein the equalizer uses finite precision arithmetic to implement an algorithm with a set of one or more coefficients selected to account for a frequency domain response of the equalizer and to compensate for round off errors attributable to the use of the finite precision arithmetic in the equalizer; and recovering an estimate of the original data by demodulating the equalized data.

16. The computer-readable medium as recited in claim 15, wherein the set of one or more coefficients is determined based upon modeling noise attributable to the round off errors as a white noise source at an output of the equalizer.

17. A computer-readable medium carrying one or more sequences of one or more instructions for processing data received from a communications channel, wherein the processing of the one or more sequences of one or more instructions by one or more processors cause the one or more processors to perform the steps of:

receiving, from the communications channel, received data that is based upon both modulated data and distortion introduced by the communications channel, wherein the modulated data is the result of original data modulated onto one or more carriers;

equalizing the received data using an equalizer to generate equalized data, wherein the equalizer uses finite precision arithmetic to implement an algorithm with a set of one or more coefficients selected to account for a frequency domain response of the equalizer and to compensate for round off errors attributable to the use of the finite precision arithmetic to demodulate the equalized data; and recovering an estimate of the original data by demodulating the equalized data.

18. The computer-readable medium as recited in claim 17, wherein the step of demodulating the equalized data includes the use of a fast fourier transfer algorithm and the set of one or more coefficients is selected to compensate for round off errors attributable to the use of the finite precision arithmetic to implement the fast fourier transfer algorithm.

19. An apparatus for processing data received from a communications channel comprising:

an equalizer configured to equalize received data from the communications channel and generate equalized data, wherein the received data is based upon both modulated data and distortion introduced by the communications channel, and the modulated data is the result of original data modulated onto one or more carriers, and wherein the equalizer is configured to use an algorithm with a set of one or more coefficients selected to account for a frequency domain response of the equalizer and to reduce the distortion introduced by the communications channel; and a demodulator configured to generate an estimate of the original data by demodulating the equalized data.

20. The apparatus as recited in claim 19, further comprising a finite impulse response (FIR) filter configured to process the receive data.

21. The apparatus as recited in claim 20, wherein the received data is modulated using discrete multitone modulation and a set of one or more (FIR) coefficients for the FIR filter is selected to maximize the number of bits used to represent each discrete multitone symbol in the equalizer.

22. The apparatus as recited in claim 19, further comprising an analog-to-digital converter configured to process the received data and the set of one or more coefficients is further selected to account for quantization noise in the analog-to-digital converter.

23. The apparatus as recited in claim 19, further comprising a coefficient generator for generating the set of one or more coefficients.

24. The apparatus as recited in claim 19, wherein the communications channel is one or more twisted pair telephone lines.

25. An apparatus for processing data received from a communications channel comprising:

an equalizer configured to equalize received data from the communications channel and generate equalized data, wherein the received data is based upon both modulated data and distortion introduced by the communications channel, and the modulated data is the result of original data modulated onto one or more carriers, and wherein the equalizer is configured to use finite precision arithmetic to implement an algorithm with a set of one or more coefficients selected to account for a frequency domain response of the equalizer and to compensate for round off errors attributable to the use of the finite precision arithmetic in the equalizer; and a demodulator configured to generate an estimate of the original data by demodulating the equalized data.

26. The apparatus as recited in claim 25, wherein the set of one or more coefficients is determined based upon modeling noise attributable to the round off errors as a white noise source at an output of the equalizer.

27. An apparatus for processing data received from a communications channel comprising:

an equalizer configured to equalize received data from the communications channel and generate equalized data, wherein the received data is based upon both modulated data and distortion introduced by the communications channel, and the modulated data is the result of original data modulated onto one or more carriers, and wherein the equalizer is configured to use finite precision arithmetic to implement an algorithm with a set of one or more coefficients selected to account for a frequency domain response of the equalizer and to compensate for round off errors attributable to the use of the finite precision arithmetic to demodulate the equalized data; and a demodulator configured to generate an estimate of the original data by demodulating the equalized data.

28. The apparatus as recited in claim 27, wherein the demodulator is configured to process the equalized data using a fast Fourier transfer algorithm and the set of one or more coefficients is selected to compensate for round off errors attributable to the use of the finite precision arithmetic to implement the fast Fourier transfer algorithm.

* * * * *

UNITED STATES PATENT AND TRADEMARK OFFICE
CERTIFICATE OF CORRECTION

PATENT NO. : 6,983,030 B2
DATED : January 3, 2006
INVENTOR(S) : Andrew Storm et al.

It is certified that error appears in the above-identified patent and that said Letters Patent is hereby corrected as shown below:

Drawings,
Replace sheet 2 of 4 with the attached Formal Drawing of figure 2.

Signed and Sealed this

Thirtieth Day of May, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,983,030 B2 | Page 1 of 1 |
| APPLICATION NO. | : 09/754007 | |
| DATED | : January 3, 2006 | |
| INVENTOR(S) | : Andrew Storm, Shane Michael Tonissen and Efstratios Skafidas | |

It is certified that error appears in the above-identified patent and that said Letters Patent is hereby corrected as shown below:

Title Page,

The following should be inserted between (65) and (51):

--RELATED U.S. APPLICATION DATA
Provisional application No. 60/173,785, filed on Dec. 30, 1999, and provisional application No. 60/173,778, filed on Dec. 30, 1999.--

Signed and Sealed this

Eighth Day of September, 2009

David J. Kappos
*Director of the United States Patent and Trademark Office*